United States Patent Office 2,751,373
Patented June 19, 1956

2,751,373

LIGHT-SENSITIVE POLYMERS FOR PHOTO-MECHANICAL PROCESSES

Cornelius C. Unruh and Donald A. Smith, Rochester, N. Y., assignors to Eastman Kodak Company, Rochester, N. Y., a corporation of New Jersey No Drawing. Application November 25, 1953, Serial No. 394,502

1 Claim. (Cl. 260—78.5)

This invention relates to light-sensitive polymers which contain recurring units having attached thereto the cinnamamide group

—NHCOCH=CH—R which confers light-sensitivity on the polymers and adapts them particularly to use in photomechanical processes. In the formula, R represents a monocyclic aryl group of the benzene series such as a phenyl or ortho-chlorophenyl group. The manner of attachment of the light-sensitive group to the polymer chain is not critical.

A typical polymer of our invention is that obtained by the esterification of a styrene-maleic anhydride copolymer with a cinnamamide such as the compound N-(m-hydroxymethylphenyl) cinnamamide

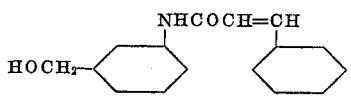

Accordingly, the resulting polymer has the following probable general structure:

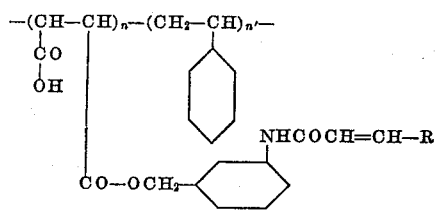

The relative values of the large integers $n$ and $n'$ depend upon the relative proportions of the maleic anhydride and styrene units in the polymer although the copolymers containing substantially equal amounts of the two monomeric units form a valuable and preferred embodiment of our invention. The polymer may, of course, contain some unesterified maleic anhydride or maleic acid units depending on whether the maleic anhydride polymer units have been more or less completely esterified with the cinnamamide compound. In the above general formulas as in those general formulas hereinafter, R represents a monocyclic aryl group of the benzene series, such as a phenyl, p-tolyl, o-chlorophenyl, m-nitrophenyl, cyanophenyl, e. g., p-cyanophenyl, sulfophenyl, e. g., o-sulfophenyl, carboxyphenyl, e. g., o-carboxyphenyl, alkoxyphenyl, e. g., p-methoxyphenyl, etc., R being dependent upon the particular cinnamoyl halide used in making the cinnamamide compounds. Other copolymers containing maleic anhydride groups such as a 1:1 maleic anhydride-vinyl acetate copolymer and a 1:1 maleic anhydride-vinyl ethyl ether copolymer can be reacted similarly with the above hydroxy cinnamamide compounds to yield light-sensitive polymers.

Similarly, homopolymers containing acid halide groups such as polyacrylyl chloride and polymethacrylyl chloride can be reacted with the hydroxy cinnamamide compounds above to yield polymers containing recurring units having the general structures

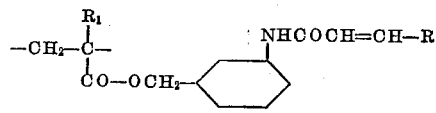

in which $R_1$ is hydrogen or methyl and R is as above mentioned.

The cinnamamide compounds such as N-(m-hydroxymethylphenyl) cinnamamide, N-(m-hydroxymethylphenyl)-o-chlorocinnamamide, or N-(m-hydroxymethylphenyl)-m-nitrocinnamamide can also be reacted with copolymers of acrylyl halides to obtain light-sensitive polymers. For example, the copolymers of the acrylyl chlorides such as copolymers of acrylyl chloride and methacrylyl chloride with polymerizable monomers such as ethylene, vinyl acetate, vinyl methyl ketone, vinyl chloride, isobutylene, vinyl fluoride, methyl acrylate, vinyl ethyl ether, acrylonitrile, styrene, etc., can be reacted with the cinnamamide compounds to obtain the light-sensitive polymers.

The hydroxy cinnamamides used in our invention are obtained by reaction of m-aminobenzyl alcohol with cinnamic acid halides such as cinnamoyl chloride, α-phenyl, β-phenyl, o-chloro and m-nitrocinnamic acid chlorides.

Light-sensitive polymers containing cinnamamide groups can also be prepared by reaction of polymers containing free amino groups, with various cinnamic acid halides. The light-sensitive polymers of this type are obtained by reaction of polyaminostyrene (Bull. Soc. Chim. 49, 3 (1931)) with a cinnamic acid halide such as cinnamic acid chloride, o-chlorocinnamic acid chloride or m-nitrocinnamic acid chloride. The resulting polymers contain recurring units having the general structure

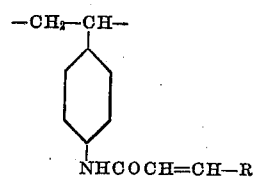

wherein R is as above mentioned. Representative cinnamic acid halides which can be used in preparation of the polymers are those given above. If desired, the cinnamic acid halides may also be reacted with copolymers of aminostyrene. Copolymers of aminostyrenes with polymerizable monomers such as those indicated above are thus reacted with the cinnamic acid halides to obtain light-sensitive polymers containing the above light-sensitive monomeric units.

Similarly, polyvinylamine and its copolymers with polymerizable monomers such as those indicated above can be reacted with the mentioned cinnamic acid halides, especially cinnamic acid chloride, to obtain light-sensitive polymers containing recurring units having the general structure

Likewise, an aminobenzaldehyde acetal of polyvinyl alcohol or an aminobenzaldehyde acetal of a partially deesterified polyvinyl ester can be reacted with the representative cinnamic acid halides mentioned to obtain polymers containing the light-sensitive cinnamamide group. For example, the p-aminobenzaldehyde acetals of polyvinyl alcohol are reacted with the cinnamic acid halides, such as cinnamic acid chloride, to yield polymers containing recurring units having the general structure

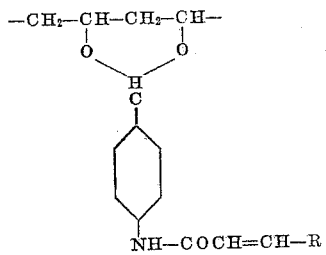

wherein R is as above indicated.

The polymers of the invention are inherently light-sensitive but surprisingly can be further sensitized to light with certain compounds to enormously increase their sensitivity to light. Such light-sensitizing agents are the nitro compound sensitizing agents of U. S. Patent 2,610,120, triphenylmethane, anthrone, quinone and ketone sensitizers of the Minsk et al. U. S. patent applications Serial Nos. 207,048–51, now U. S. Patents 2,690,966 and 2,670,285–7, respectively, filed January 21, 1951, as well as the thiazole sensitizers of the Robertson et al. U. S. patent application Serial No. 314,806, filed October 15, 1952, such as 2,4,6-trinitroaniline, Crystal Violet carbinol base, 1-carbethoxy-2-keto-3-methyl-3-azabenzanthrone, 1,2-benzanthraquinone, 4,4'-tetramethyldiaminodiphenyl ketone and 2-benzoyl methylene-1-methyl-β-naphthiazoline. That is, the polymers are particularly useful for forming resist images on various printing plate supports such as aluminum, zinc, copper and magnesium. When coatings of the polymers on such supports are exposed to a subject such as a line, halftone, or continuous tone image, the coatings are rendered insoluble in organic solvents in the region of exposure and the unexposed area can be removed with solvents for the polymers. When the sensitizing agents are incorporated into the polymer coating, the light sensitivity of the coatings is increased and accordingly the exposure time in the process is decreased. The resulting relief images of insoluble polymer can then be used as a plate etching resist or if prepared on a lithographic surface such as zinc, surface-hydrolyzed cellulose ester, casein, etc., the relief image can be inked and printed in a lithographic press.

Example 1

A solution of 4.0 g. of N-(m-hydroxymethylphenyl)-cinnamamide and 3.15 g. of a 1:1 copolymer of styrene-maleic anhydride in 30 ml. of dry pyridine were heated for 22 hours on the steam bath. After cooling, the solution was poured into dilute acetic acid and the product collected. The polymer was purified by twice dissolving it in pyridine and precipitating in dilute acetic acid. After washing and drying, the yield was 6.0 g. The nitrogen value found was 2.9% as compared with a calculated value of 3.1%. Sensitometric evaluation gave this polymer an unsensitized speed of 16, whereas when it was sensitized by 2-benzoylmethylene-1-methyl-β-naphthylthiazoline, it showed a speed of 1400. When the polymer was coated upon a metal support, it was found that it could be differentially insolubilized by exposure to light under a negative.

Example 2

A suspension of 5.0 g. of polyaminostyrene hydrochloride in 30 ml. of dimethylformamide was treated gradually with 10 ml. of 10% potassium hydroxide. The resultant solution was then treated with 20 ml. of pyridine containing 10 g. of cinnamoyl chloride with cooling. The mixture was then drowned in water, the solid collected, dissolved in dimethylformamide and precipitated in water and dried. The yield was 3 g. A sample coated on a well-known hydrophilic lithographic paper gave an inkable image when exposed to ultraviolet light.

What we claim is:

A light-sensitive polymer capable of forming a continuous coating on a base and containing recurring units having the structure

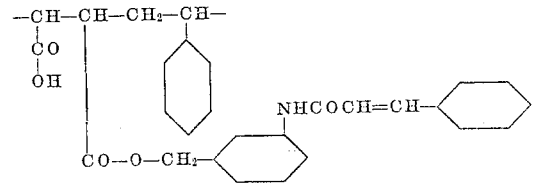

References Cited in the file of this patent
UNITED STATES PATENTS

| | | |
|---|---|---|
| 2,513,190 | McQueen | June 27, 1950 |
| 2,562,528 | Corner | July 31, 1951 |
| 2,610,120 | Minsk et al. | Sept. 9, 1952 |